United States Patent
Atawia

(10) Patent No.: US 12,225,412 B2
(45) Date of Patent: Feb. 11, 2025

(54) ADAPTIVE RADIO ACCESS NETWORK BIT RATE SCHEDULING

(71) Applicant: Dell Products, L.P., Round Rock, TX (US)

(72) Inventor: Ramy Atawia, Kanata (CA)

(73) Assignee: Dell Products, L.P., Round Rock, TX (US)

( * ) Notice: Subject to any disclaimer, the term of this patent is extended or adjusted under 35 U.S.C. 154(b) by 327 days.

(21) Appl. No.: 17/647,054

(22) Filed: Jan. 5, 2022

(65) Prior Publication Data

US 2023/0217312 A1    Jul. 6, 2023

(51) Int. Cl.
*H04W 24/08* (2009.01)
*H04W 28/22* (2009.01)

(52) U.S. Cl.
CPC ........... *H04W 28/22* (2013.01); *H04W 24/08* (2013.01)

(58) Field of Classification Search
CPC ...... H04W 28/22; H04W 24/08; H04W 24/02
See application file for complete search history.

(56) References Cited

U.S. PATENT DOCUMENTS

| | | | | |
|---|---|---|---|---|
| 6,760,596 B1* | 7/2004 | Fiorini | ........... | H04W 28/18 455/67.11 |
| 11,765,623 B1* | 9/2023 | Cai | ........... | H04W 76/10 370/229 |
| 2005/0282572 A1 | 12/2005 | Wigard et al. | | |
| 2013/0114497 A1* | 5/2013 | Zhang | ........... | H04W 72/04 370/312 |
| 2017/0289840 A1 | 10/2017 | Sung et al. | | |
| 2018/0115927 A1 | 4/2018 | Vesterinen et al. | | |
| 2020/0007691 A1 | 1/2020 | Wong et al. | | |
| 2021/0258866 A1* | 8/2021 | Chou | ........... | H04W 48/16 |
| 2021/0306218 A1* | 9/2021 | Cui | ........... | H04L 41/0894 |
| 2022/0109622 A1* | 4/2022 | Yeh | ........... | H04L 69/40 |
| 2022/0116799 A1* | 4/2022 | Wang | ........... | H04B 7/0452 |
| 2022/0201556 A1* | 6/2022 | Yang | ........... | H04W 48/18 |
| 2022/0286754 A1* | 9/2022 | Pandit | ........... | H04N 21/4621 |
| 2023/0038198 A1 | 2/2023 | Lewis et al. | | |

OTHER PUBLICATIONS

"O-RAN Architecture Overview," https://docs.o-ran-sc.org/en/latest/architecture/architecture.html, 2021, 2 pages.
Notice of Allowance received for U.S. Appl. No. 17/647,074 dated Apr. 24, 2024, 29 pages.
Non-Final Office Action received for U.S. Appl. No. 17/647,066 dated Jun. 27, 2024, 50 pages.
Notice of Allowance for U.S. Appl. No. 17/647,066 dated Jan. 2, 2025.

* cited by examiner

*Primary Examiner* — Meng Vang
*Assistant Examiner* — Hector Reyes
(74) *Attorney, Agent, or Firm* — Amin, Turocy & Watson, LLP

(57) ABSTRACT

The described technology is generally directed towards adaptive radio access network bit rate scheduling. Minimum bit rates for user equipment can be adjusted in a manner that accounts for the impact of the minimum bit rates on network performance. Ranges of minimum bit rates can be established for user equipment, and minimum bit rates can be adjusted within the ranges. A minimum bit rate can be decreased when it produces a relatively higher impact on network performance, and the minimum bit rate can be increased when it produces a relatively lower impact on network performance.

20 Claims, 12 Drawing Sheets

| Policy Index | Conditions | Actions |
|---|---|---|
| 1 | RSRP < $x_1$ | Min bitrate = $b_1$ |
| 2 | $x_1$ <= RSRP < $x_2$ | Min bitrate = $b_2$ |
| 3 | $x_1$ <= RSRP < $x_2$ AND PRB utilization > U | Min bitrate = $b_3$ |
| ... | ... | ... |

FIG. 7

| Used Policy | Monitored Network KPI | Evaluation | Actions |
|---|---|---|---|
| 1 | Min bitrate achieved = $b_x$ and $b_x > b_1$ | Valid policy | Keep current setting |
| 2 | Min bitrate achieved = $b_x$ and $b_x < b_1$ | Suboptimal policy | Update action set $b_2 = b_x$ |
| 3 | Min bit rate achieved for PRB utilization < $U_1$ | Suboptimal policy | Update condition Set $U = U_1$ |
| 3 | Min bit rate not achieved for PRB utilization > $U_1$ | | |

FIG. 8

ADAPTIVE RADIO ACCESS NETWORK BIT RATE SCHEDULING

BACKGROUND

Fourth generation (4G), fifth generation (5G) and subsequent generation cellular networks can assign minimum bit rates to user equipment. Minimum bit rates can be used to ensure quality of service (QOS). For example, minimum bit rates can be used to ensure the ability to stream video data at a certain quality and without interruptions.

Existing approaches to assigning minimum bit rates use constant target bit rates, which can negatively impact network performance in some situations. For example, although a constant high target bit rate can ensure QoS satisfaction, it can also pose challenges when user devices configured with the constant high target bit rate are located in bad radio frequency (RF) conditions. In such a scenario, a radio access network (RAN) node, such as a base station, may allocate a large amount of radio transmission resources to meet the constant high target bit rate. As a result, the network can suffer from low spectrum efficiency and increased inter-cell interference.

Low spectrum efficiency can result, e.g., from fewer resources being allocated to other user equipment, including other user equipment experiencing good RF conditions for which it is relatively inexpensive, in terms of radio transmission budget, to provide a satisfactory QoS. Meanwhile, increased inter-cell interference can result from, e.g., increased radio transmission time and/or increased power levels associated with transmissions to meet the constant high target bit rate.

The above-mentioned problems can be avoided to some extent by using lower constant target bit rates. However, constant low target bit rates can negatively impact overall QoS levels that might otherwise be achieved by user equipment over time. When a user equipment is in good RF conditions, a higher minimum bit rate can improve QoS with a relatively small impact on the network and other user equipment.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 7 is a table representing a portion of an example minimum bit rate policy, in accordance with various aspects and embodiments of the subject disclosure.

FIG. 8 is a table representing example evaluation and update of a minimum bit rate policy, in accordance with various aspects and embodiments of the subject disclosure.

DETAILED DESCRIPTION

Figure 1:
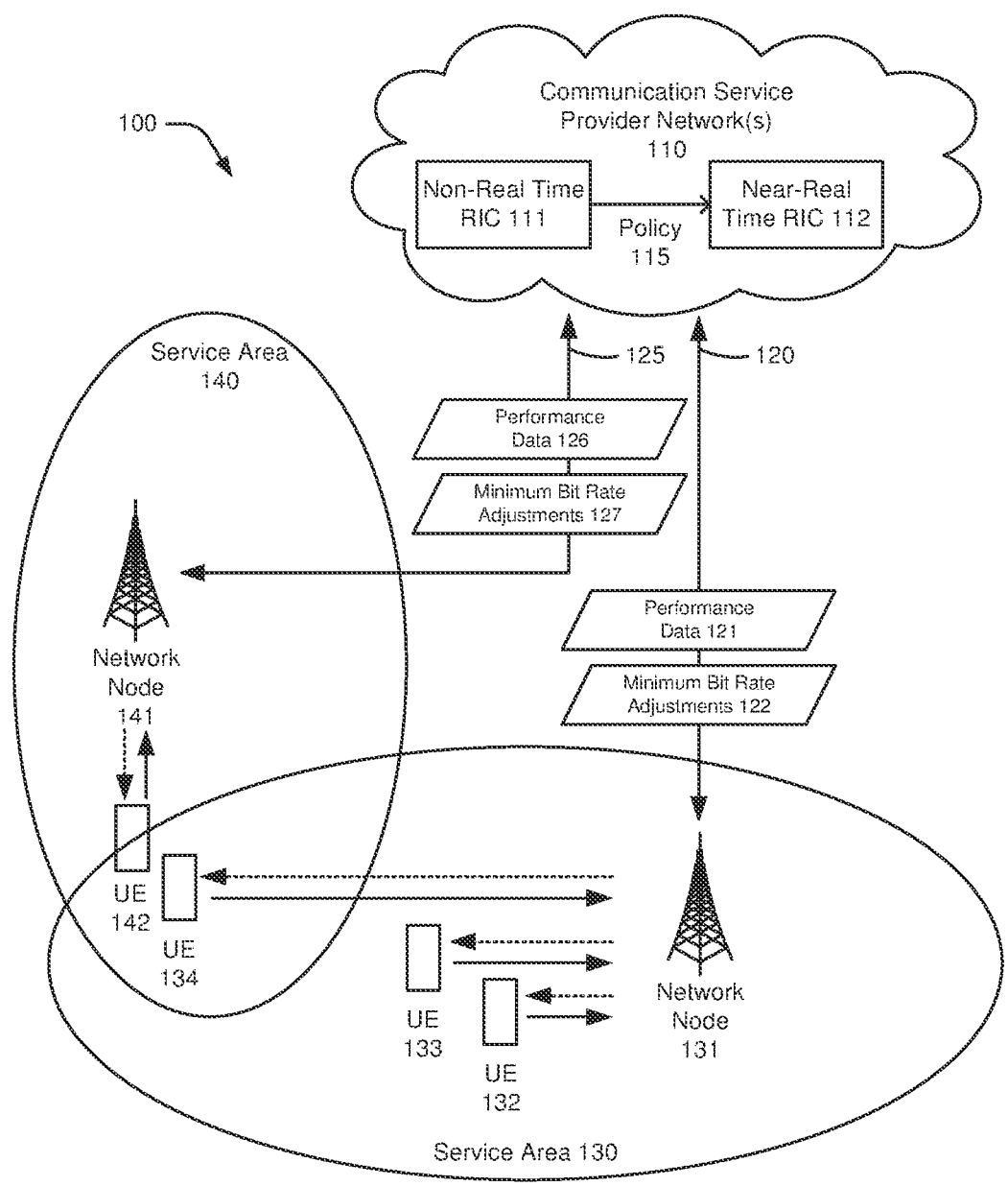
FIG. 1 illustrates an example wireless communication system configured to adjust minimum bit rates of user equipment, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards adaptive radio access network bit rate scheduling. Minimum bit rates for user equipment can be adjusted in a manner that accounts for the impact of the minimum bit rates on network performance. Ranges of minimum bit rates can be established for user equipment, and minimum bit rates can be adjusted within the ranges. A minimum bit rate can be decreased when it produces a relatively higher impact on network performance, and the minimum bit rate can be increased when it produces a relatively lower impact on network performance. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 4G, 5G, or other next generation networks, the disclosed aspects are not limited to a 4G or 5G implementation, and/or other network next generation implementations, such as sixth generation (6G), as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates an example wireless communication system configured to adjust minimum bit rates of user equipment, in accordance with various aspects and embodiments of the subject disclosure. The example wireless communication system 100 includes network nodes 131, 141 of a radio access network (RAN). The network nodes 131, 141 provide wireless communication service in service areas 130, 140. User equipment (UE) in the service area 130, such as UE 132, UE 133, and UE 134, can send and receive communications via network node 131. UE 142 in the service area 140 can send and receive communications via network node 141.

The network nodes 131, 141 can communicate with communication service provider network(s) 110 via backhaul links 120, 125. The communication service provider network(s) 110 can include a variety of network equipment, including, e.g., a non-real time RAN intelligent controller (RIC) 111 and a near-real time RIC 112. In some embodiments, the non-real time RIC 111 can generate a policy 115 and provide the policy 115 to the near-real time RIC 112, and the near-real time RIC 112 can apply the policy 115 via the network nodes 131, 141.

In some embodiments, the communication service provider network(s) 110 can receive performance data 121, 126 from the network nodes 131, 141, and the communication service provider network(s) 110, e.g., the non-real time RIC 111, can use the performance data 121, 126 to generate the policy 115. The near-real time RIC 112 can use the performance data 121, 126 and the policy 115 to determine minimum bit rate adjustments 122, 127. The near-real time RIC 112 can send the minimum bit rate adjustments 122, 127 to the network nodes 131, 141, and the network nodes 131, 141 can apply the minimum bit rate adjustments 122, 127 in connection with the service being provided to UEs 132, 133, 134 and UE 142.

In general, in embodiments according to FIG. 1, the wireless communication system 100 can be configured to adjust minimum bit rates used in connection with providing wireless communication service to UEs 132, 133, 134, 142. The UEs 132, 133, 134, 142 can be associated with acceptable minimum bit rate ranges, and the wireless communication system 100 can be configured to adjust minimum bit rates associated with UEs 132, 133, 134, 142 while remaining within their acceptable ranges. Minimum bit rates can be adjusted for uplink (UL) communications, downlink (DL) communications, or both. The wireless communication system 100 can be configured to identify opportunities to improve network performance using minimum bit rate adjustments, and the wireless communication system 100 can determine and deploy the minimum bit rate adjustments 122, 127 in order to improve network performance, while also optionally making adjustments to retain high quality of experience (QoE) for the UEs 132, 133, 134, 142.

Several different scenarios can give rise to degraded network performance which can be addressed by minimum bit rate adjustments according to this disclosure. A first example scenario involves network node 131 and UEs 132, 133, 134. In the first example scenario, the UE 134 is assigned a high minimum bit rate and is also in poor RF conditions, optionally with low modulation and coding scheme (MCS) throughput. As a result, the UE 134 can use a high number of the network node's 131 available physical resource blocks (PRBs). As another result, the network node 131 has limited remaining PRBs available for UEs 132, 133, even though the UEs 132, 133 may be in better RF conditions than UE 134. The network node 131 therefore can have lower overall cell throughput and lower spectral efficiency, resulting in degraded performance. Some embodiments of this disclosure can be directed to identifying this first example scenario and addressing it by lowering the minimum bit rate of UEs such as UE 134. Conversely, embodiments can identify when network conditions have changed such that restoring/increasing the minimum bit rate of UE 134 can be accomplished without degrading network performance.

A second example scenario involves network nodes 131 and 141, and UEs 134 and 142. In the second example scenario, similar to the first scenario, the UE 134 is assigned a high minimum bit rate and is also in poor RF conditions, optionally with low modulation and coding scheme (MCS) throughput. As a result, the network node 131 may spend a relatively large amount of "airtime," on UE 134, i.e., time during which radio transmissions are being sent or received from UE 134. As another result, the UE 142 and network node 141 can experience increased interference, and resulting degraded performance, in connection with wireless service provided to UE 142. Some embodiments of this disclosure can be directed to identifying this second example scenario and addressing it by lowering the minimum bit rate of UEs such as UE 134. As in the first scenario, embodiments can identify when network conditions have changed such that restoring/increasing the minimum bit rate of UE 134 can be accomplished without degrading network performance.

Some embodiments can apply machine learning (ML) to continuously evaluate and improve minimum bit rates applied to UEs 132, 133, 134, 142 under various different network conditions. For example, embodiments can use the non-real time RIC 111 to evaluate performance data 121, 126 and to generate the policy 115, wherein the policy 115 includes minimum bit rates to apply to UEs 132, 133, 134, 142 under various different network conditions. The policy 115 can be carried out by the near-real time RIC 112, e.g., by using the policy 115 to identify the minimum bit rate adjustments 122, 127. The effectiveness of the policy 115 can be subsequently evaluated at the non-real time RIC 111, using subsequent performance data 121, 126. The non-real time RIC 111 can modify the policy 115 and provide the modified policy 115 to the near-real time RIC 112. A repeating cycle of receiving performance data 121, 126, modifying the policy 115, and employing the modified policy 115 to adjust minimum bit rates can be used to continuously improve the minimum bit rate adjustments 122, 127 that are employed under different network conditions.

The non-limiting term "user equipment" can refer to any type of device that can communicate with network nodes 131, 141 in a cellular or mobile communication system 100. UEs 132, 133, 134, 142 can have one or more antenna panels having vertical and horizontal elements. Examples of UEs 132, 133, 134, 142 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB)

dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 132, 133, 134, 142 can also comprise IoT devices that communicate wirelessly.

In various embodiments, system 100 comprises communication service provider network(s) 110 serviced by one or more wireless communication network providers. Communication service provider network(s) 110 can comprise a "core network". In example embodiments, UEs 132, 133, 134, 142 can be communicatively coupled to the communication service provider network(s) 110 via network nodes 131, 141. The network nodes 131, 141 (e.g., network node devices) can communicate with UEs 122, 123, and 124, thus providing connectivity between the UEs 132, 133, 134, 142 and the wider cellular network. The UEs 132, 133, 134, 142 can send transmission type recommendation data to the network nodes 131, 141. The transmission type recommendation data can comprise a recommendation to transmit data via a closed loop multiple input multiple output (MIMO) mode and/or a rank-1 precoder mode.

Network nodes 131, 141 can each have a cabinet and other protected enclosures, computing devices, an antenna mast, and multiple antennas for performing various transmission operations (e.g., MIMO operations) and for directing/steering signal beams. Network nodes 131, 141 can each comprise one or more base station devices which implement features of the network node. Network nodes can serve several cells, depending on the configuration and type of antenna. In example embodiments, UEs 132, 133, 134, 142 can send and/or receive communication data via wireless links to the network nodes 131, 141. The dashed arrow lines from the network nodes 131, 141 to the UEs 132, 133, 134, 142 represent downlink (DL) communications to the UEs 132, 133, 134, 142. The solid arrow lines from the UEs 132, 133, 134, 142 to the network nodes 131, 141 represent uplink (UL) communications.

Communication service provider networks 110 can facilitate providing wireless communication services to UEs 132, 133, 134, 142 via the network nodes 131, 141 and/or various additional network devices (not shown) included in the one or more communication service provider networks 110. The one or more communication service provider networks 110 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 110 can be or comprise the wireless communication network and/or various additional devices and components of the wireless communication network (e.g., additional network devices and cell, additional UEs, network server devices, etc.).

The network nodes 131, 141 can be connected to the one or more communication service provider networks 110 via one or more backhaul links 120, 125. For example, the one or more backhaul links 120, 125 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 120, 125 can also comprise wireless link components, such as but not limited to, line-of-sight (LOS) or non-LOS links which can comprise terrestrial air-interfaces or deep space links (e.g., satellite communication links for navigation). Backhaul links 120, 125 can be implemented via a "transport network" in some embodiments. In another embodiment, network nodes 131, 141 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UEs 132, 133, 134, 142 and the network nodes 131, 141). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 132, 133, 134, 142 and the network nodes 131, 141) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different subbands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHZ) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
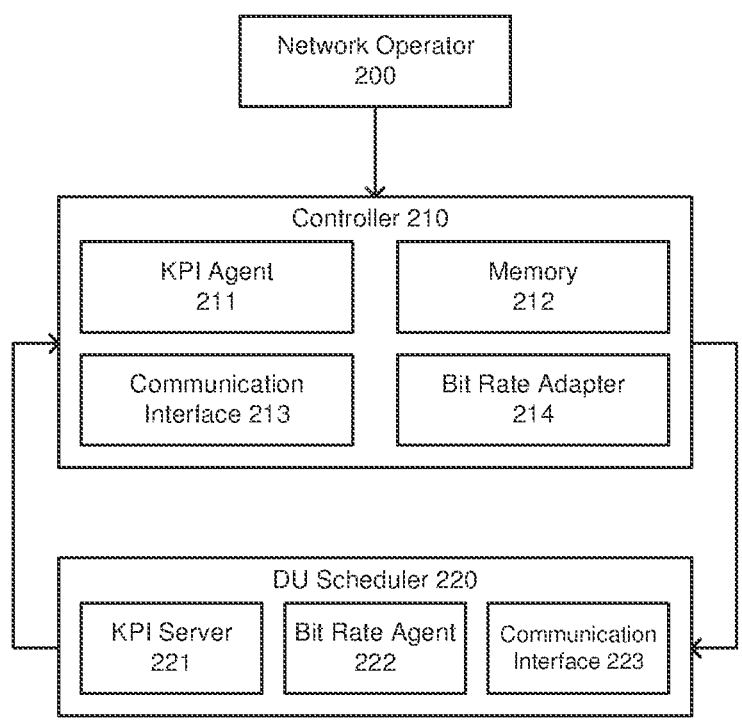
FIG. 2 illustrates an example general architecture of a system configured to adjust minimum bit rates within a wireless communication system, in accordance with various aspects and embodiments of the subject disclosure.

FIG. 2 illustrates an example general architecture of a system configured to adjust minimum bit rates within a wireless communication system, in accordance with various aspects and embodiments of the subject disclosure. FIG. 2 includes a network operator 200, a controller 210, and a distributed unit (DU) scheduler 220. The controller 210 comprises a key performance indicator (KPI) agent 211, a memory 212, a communication interface 213, and a bit rate adapter 214. The DU scheduler 220 comprises a KPI server 221, a bit rate agent 222, and a communication interface 223.

In FIG. 2, the communication interface 213 in the controller 210 can be configured to exchange information with RAN nodes, via the DU scheduler 220. The communication interface 213 can exchange information with the communication interface 223 at the DU scheduler 220. The communication interface 213 can furthermore be configured to read input from the network operator 200.

The KPI agent 211 in the controller 210 can be configured to receive network performance related measurements, e.g., performance data 121, 126 illustrated in FIG. 1, in order to evaluate the DU scheduler's 220 current bit rate configurations and the quantity of PRBs allocated to various user equipment by the DU scheduler 220.

The bit rate adapter 214 in the controller 210 can be configured to host bit rate adaptation logic, which can adapt bit rates based on target KPIs received from the network operator 200 and network conditions. The memory 212 in the controller 210 can be configured to store the latest bit rate decisions and to create policies which can be evaluated and reused in the future.

Furthermore, the communication interface 223 in the DU scheduler 220 can be configured to exchange information with the controller 210 and other RAN nodes, e.g., centralized units (CUs) and radio units (RUs). The bit rate agent 222 in the DU scheduler 220 can be configured to reconfigure minimum bit rates, used by the DU scheduler 220 for each user equipment based on real-time bit rate adjustment inputs or previous policies received from the controller 210. The KPI server 221 in the DU scheduler 220 can be configured to collect network information for each user equipment and derive corresponding KPIs to be sent to the KPI agent 211.

In example operations according to FIG. 2, the controller 210 can continuously collect user equipment channel conditions and network load information, and can use collected information to estimate optimal minimum bit rates that can be configured for each user equipment. The controller 210 can periodically communicate new minimum bit rates to the DU scheduler 220 to meet target KPIs specified by the network operator 200. KPIs can include, e.g., cell throughput targets, spectral efficiency targets, or other performance targets. The controller 210 can also be configured to satisfy constraints on the minimum bit rate ranges of user equipment. Moreover, the controller 210 can be configured to store previous minimum bit rate recommendations, for use in evaluating resultant performance, improving future minimum bit rate targets, and reusing minimum bit rate targets in future decisions under similar network conditions.

In a first example embodiment of the architecture illustrated in FIG. 2, the controller 210 can be implemented as part of a near-real time RIC 112, illustrated in FIG. 1. Such embodiments can aim to decrease minimum bit rates of user equipment when a target cell throughput is not achieved, and vice versa. This can be done while considering ranges of allowed bit rates for different user equipment, and target cell spectral efficiency.

In a second example embodiment of the architecture illustrated in FIG. 2, the controller 210 can be configured to learn minimum bit rate configurations that lead to improved cell performance for each network condition, wherein a network condition can comprise a combination of signal strength (e.g., reference signal received power RSRP) conditions and load (e.g., PRB utilization) conditions. Learned minimum bit rate configurations and corresponding network conditions can be stored in a knowledge base which can be iteratively improved based on the achieved bit rate. Such a knowledge base can be used to make future decisions with a higher probability of recommending an optimal configuration, in comparison to reactive configuration methods.

In a third example embodiment of the architecture illustrated in FIG. 2, the controller 210 can be configured to address intercell interference. When multiple cells, e.g., a group of cells, are managed by a same controller 210, the controller 210 can configure minimum bit rates of the group of cells such that the intercell interference is decreased. For example, a first cell may have lower performance than other cells in the group. The performance of the first cell can be improved by decreasing a suboptimal minimum bit rate employed by a neighboring cell of the group. The suboptimal minimum bit rate used by the neighboring cell can be causing excessive interference to the first cell. Decreasing the suboptimal minimum bit rate can improve performance of the first cell.

Figure 3:
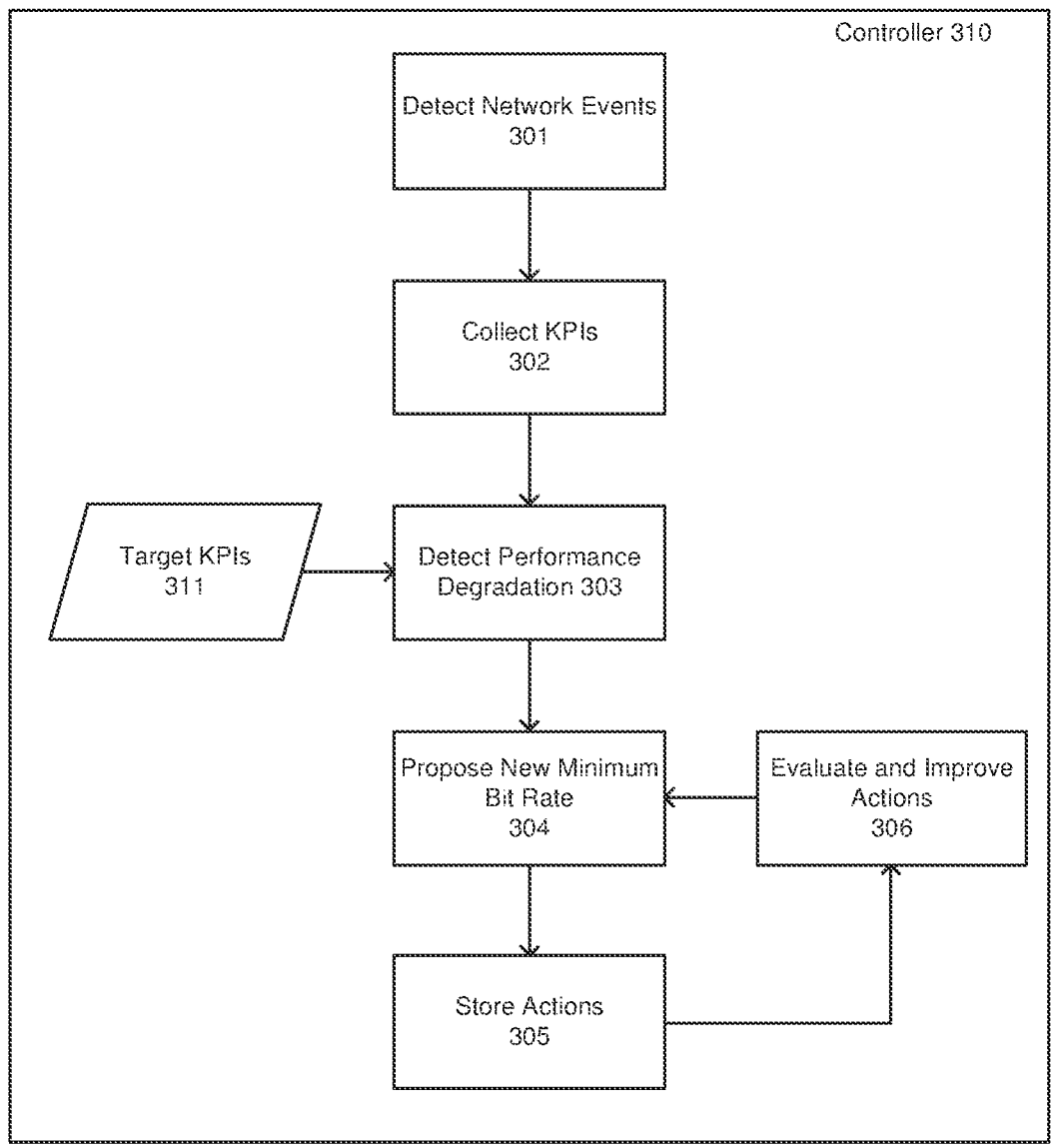
FIG. 3 illustrates an example controller that can implement the controller illustrated in FIG. 2, in accordance with various aspects and embodiments of the subject disclosure.

FIG. 3 illustrates an example controller that can implement the controller illustrated in FIG. 2, in accordance with various aspects and embodiments of the subject disclosure. The example controller 310 can implement the controller 210 in some embodiments. The example controller 310 includes various illustrated components and an example flow/sequence of the operations. Detect network events 301 can be followed by collect KPIs 302. Collect KPIs 302 can be followed by detect performance degradation 303. Detect performance degradation 303 can receive target KPIs 311 and can be followed by propose new minimum bit rate 304. Propose new minimum bit rate 304 can be followed by store actions 305. Store actions 305 can be followed by evaluate and improve actions 306. Evaluate and improve actions 306 can be followed by propose new minimum bit rate 304, so the operations 304, 305 and 306 are illustrated as being performed in a repeating cycle.

In example operations according to FIG. 3, detect network events 301 can be configured to detect events such as new target KPI values from a network operator, new users admitted to a cell, or network traffic having suboptimal minimum bit rate values. In response to a detected network event, detect network events 301 can trigger the controller 310 to reconfigure minimum bit rates.

In response to a detected event at 301, the controller 310 can collect KPIs 302. KPIs collected at 302 can include, e.g., user equipment bit rates over a preceding time window of x seconds, an average cell throughput, and PRB utilization data. In some embodiments, KPIs can be collected from a RAN node based on a request from the controller 310. In other embodiments, KPIs can be collected from a RAN node periodically.

Detect performance degradation 303 can be configured to compare current KPIs, collected at 302, with target KPIs 311. When the current KPIs do not meet the target KPIs 311, detect performance degradation 303 can trigger calculating and proposing new minimum bit rates via 304.

Propose new minimum bit rate 304 can be configured to propose new minimum bit rates for user equipment. In some embodiments, proposed new minimum bit rates can be based on a calculated degree of degradation. Proposed new minimum bit rates can be retrieved from stored values or can be newly calculated. The new minimum bit rates can be subjected to a set of constraints defined by the network operator, such as lowest and highest allowed values, which in some circumstances can correspond to application specific quality ranges (e.g., video resolutions required for different applications). The new minimum bit rates can be applied to a RAN node for which the new minimum bit rates are determined, as described herein.

Store actions 305 can be configured to store "actions," e.g., minimum bit rate adjustment values to be applied to user equipment, alongside network conditions corresponding to such actions. In some embodiments, similar actions can be either grouped or filtered to create a knowledge base and/or policy to be applied under future detected network conditions.

Evaluate and improve actions 306 can be configured to observe resultant KPIs from a RAN node to which new minimum bit rates are applied. Subsequent to application of new minimum bit rates, evaluate and improve actions 306 can analyze iterations of KPI data received from the RAN node, and can fine tune minimum bit rate values or the network conditions at which they shall be applied. For example, if applying new minimum bit rates results in performance that is below a target value, evaluate and improve actions 306 can modify the minimum bit rates to be applied during a next application of new minimum bit rates to the RAN node.

Figure 4:
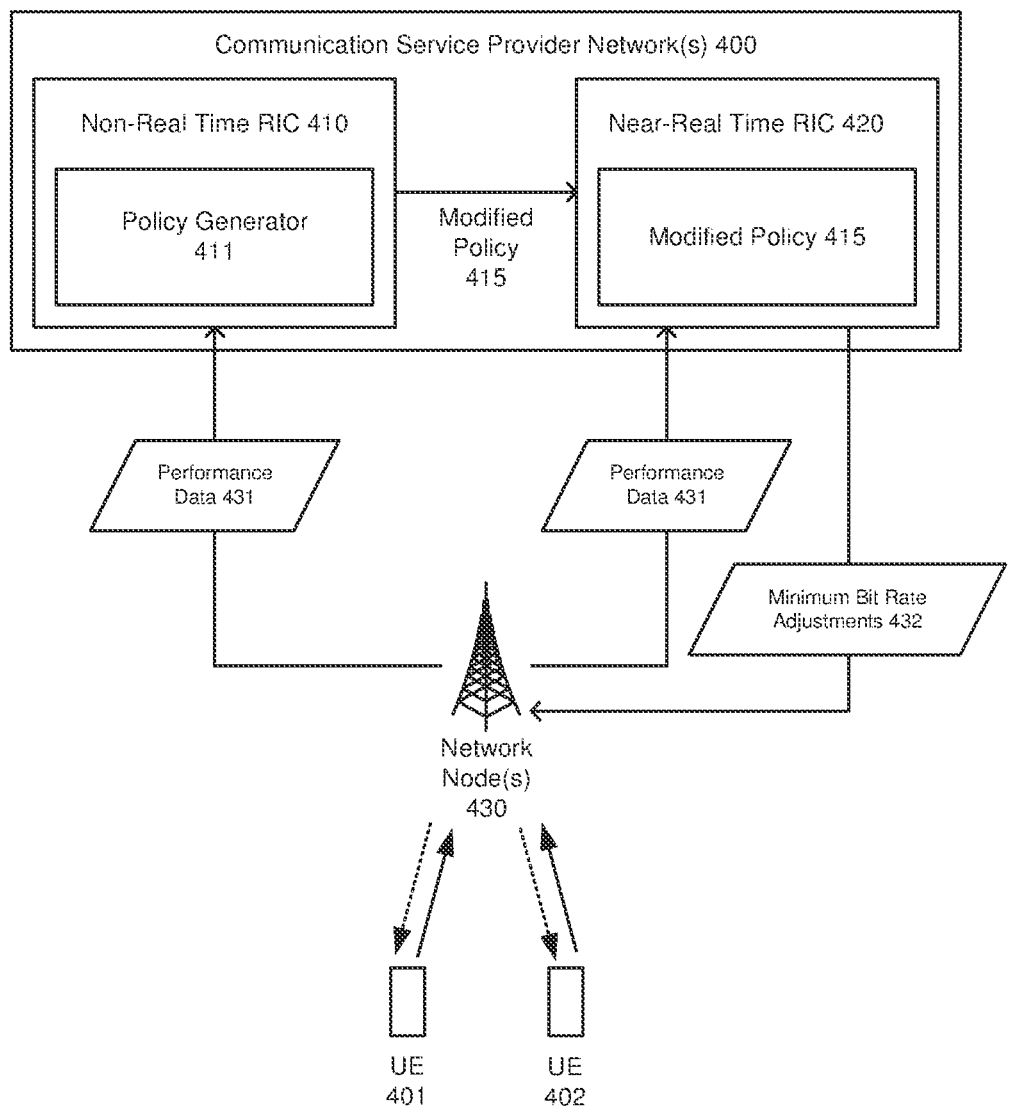
FIG. 4 illustrates example generation and use of a minimum bit rate policy to adjust minimum bit rates, in accordance with various aspects and embodiments of the subject disclosure.

FIG. 4 illustrates example generation and use of a minimum bit rate policy to adjust minimum bit rates, in accordance with various aspects and embodiments of the subject disclosure. FIG. 4 includes communication service provider network(s) 400, network node(s) 430, and example UEs 401 and 402. In some embodiments, the communication service provider network(s) 400 can implement the communication service provider network(s) 110 illustrated in FIG. 1, the network node(s) 430 can implement the network node(s) 131, 141 illustrated in FIG. 1, and the UEs 401 and 402 can implement any of the UEs 132, 133, 134, 142 illustrated in FIG. 1.

The communication service provider network(s) 400 include a non-real time RIC 410 and a near-real time RIC 420. The non-real time RIC 410 includes a policy generator 411, and the non-real time RIC 410 can provide a modified policy 415 to the near-real time RIC 420. The near-real time RIC 420 is illustrated as including the policy 415.

The network node(s) 430 are illustrated as communicating with the UEs 401, 402, wherein the communications between network node(s) 430 and UEs 401, 402 can use minimum bit rates established for UEs 401, 402. In some embodiments, minimum bit rates can be for uplink communications, downlink communications, or both. The network node(s) 430 can send performance data 431 to the communication service provider network(s) 400. The performance data 431 can be used by the policy generator 411 to generate the modified policy 415. The performance data 431 can also be used by the near-real time RIC 420 in connection with determining minimum bit rate adjustments 432 for the network nodes 430. The minimum bit rate adjustments 432 can be determined by applying the modified policy 415 to the performance data 431. The minimum bit rate adjustments 432 can be sent to the network node(s) 430 for application thereof in connection with the communications between the network node(s) 430 and the UEs 401, 402.

Figure 5:
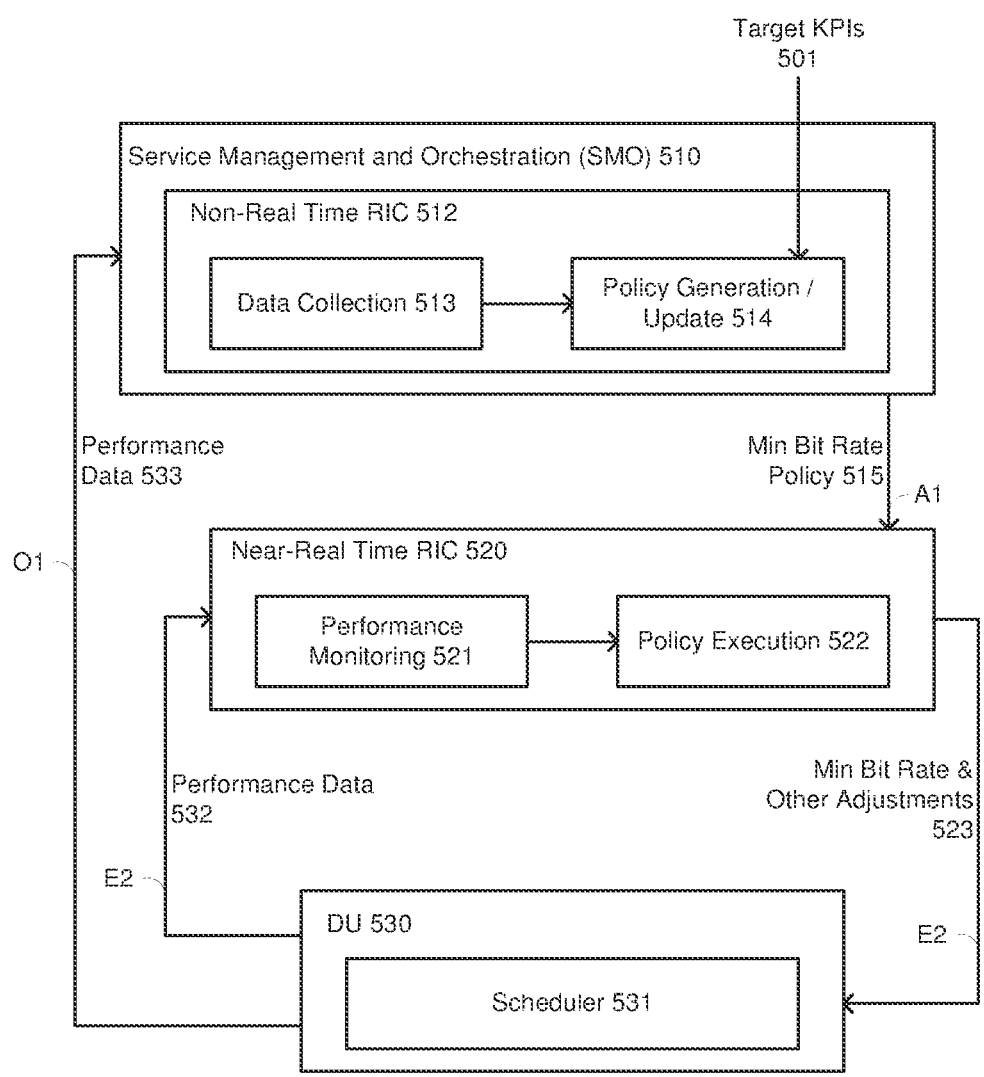
FIG. 5 illustrates an example architecture of a system configured to generate and deploy a policy to adjust minimum bit rates based on network conditions, in accordance with various aspects and embodiments of the subject disclosure.

FIG. 5 illustrates an example architecture of a system configured to generate and deploy a policy to adjust minimum bit rates based on network conditions, in accordance with various aspects and embodiments of the subject disclosure. FIG. 5 includes service management and orchestration 510, near-real time RIC 520 and DU 530. Service management and orchestration 510 includes a non-real time RIC 512, and the non-real time RIC 512 includes data collection 513 and policy generation/update 514. The near-real time RIC 520 includes performance monitoring 521 and policy execution 522. The DU 530 includes scheduler 531.

In FIG. 5, the policy generation/update 514 can receive target KPIs 501. The DU 530 and the service management and orchestration 510 can communicate via an O1 interface, whereby the DU 530 can provide performance data 533 to the service management and orchestration 510. The service management and orchestration 510 and the near-real time RIC 520 can communicate via an A1 interface, whereby the service management and orchestration 510 can provide a minimum bit rate policy 515 to the near-real time RIC 520. The near-real time RIC 520 and the DU 530 can communicate via an E2 interface, whereby the near-real time RIC 520 can provide minimum bit rate adjustments and other adjustments 523 to the DU 530. Furthermore, the DU 530 can provide performance data 532 to the near-real time RIC 520 via the E2 interface.

In the embodiment illustrated in FIG. 5, the controller 210 described in connection with FIG. 2 can be implemented via service management and orchestration 510 and near-real time RIC 520. Embodiments according to FIG. 5 can use performance data 533 to generate a minimum bit rate policy 515. The minimum bit rate policy 515 can be provided to the near-real time RIC 520, and the near-real time RIC 520 can use performance data 532 and the minimum bit rate policy 515 to determine minimum bit rate and other adjustments 523. The minimum bit rate and other adjustments 523 can be sent to the DU 530 for application to RAN communications with user equipment.

In some embodiments, the performance data 533 provided to the service management and orchestration 510 can comprise, inter alia, network conditions data such as channel data and load data. The channel data can include, e.g., reference signal received power (RSRP) data and/or reference signal received quality (RSRQ) data collected from UEs. The load data can include, e.g., PRB utilization data, including PRBs used per UE and total PRBs used by a cell. Further example performance data 533 can comprise UE throughput data, cell throughput data, RF conditions data, and current minimum bit rates applied to UEs.

In some embodiments, the minimum bit rate policy 515 can include respective network conditions, respective thresholds corresponding to the respective network conditions, and respective actions corresponding to the respective network conditions and respective thresholds. The actions can define minimum bit rate adjustments under network conditions defined by the network conditions and thresholds. The actions can optionally further define other adjustments, other than minimum bit rate adjustments, such as adjustments to maximum numbers of PRBs allowed per UE, and adjustments to UE priority ratios. Further description of the minimum bit rate policy 515 is provided below with reference to FIGS. 6, 7, and 8.

In some embodiments, the performance data 532 provided to the near-real time RIC 520 can comprise, inter alia, data similar or identical to the performance data 533, described above. The performance data 532 can optionally comprise a subset of the performance data 533, wherein the subset enables the near-real time RIC 520 to apply the minimum bit rate policy 515.

In some embodiments, the minimum bit rate and other adjustments 523 can include minimum bit rate adjustments and/or other adjustments pursuant to actions selected from the minimum bit rate policy 515 by the near-real time RIC 520. The near-real time RIC 520 can select appropriate actions from the minimum bit rate policy 515 based on the performance data 532, and the selected actions can be applied via the minimum bit rate and other adjustments 523. Further example operations that can be performed by a system such as illustrated in FIG. 5 are described below with reference to FIG. 6.

Figure 6:
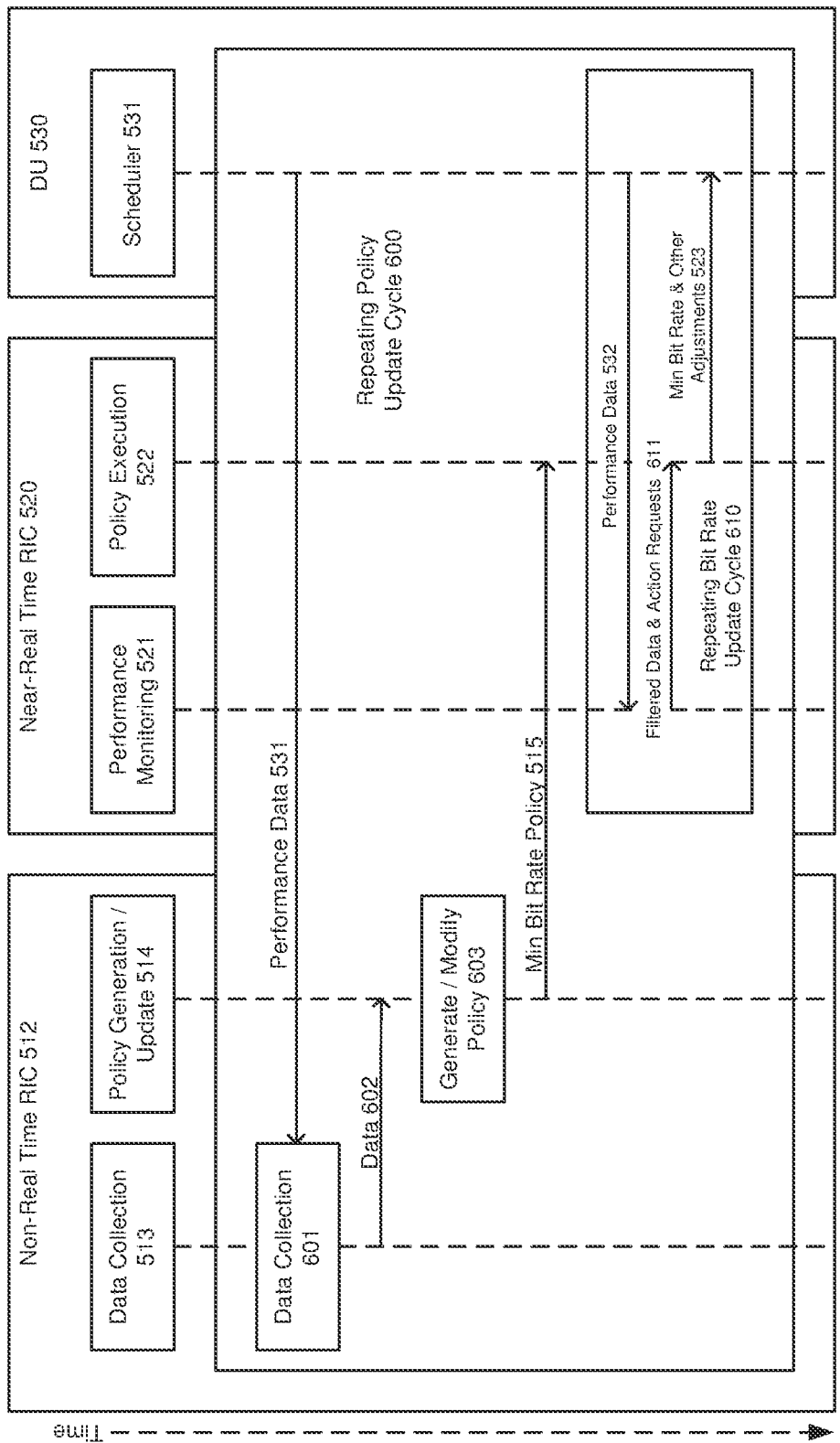
FIG. 6 illustrates an example process to adjust minimum bit rates using a system such as illustrated in FIG. 5, in accordance with various aspects and embodiments of the subject disclosure.

FIG. 6 illustrates an example process to adjust minimum bit rates using a system such as illustrated in FIG. 5, in accordance with various aspects and embodiments of the subject disclosure. FIG. 6 includes the non-real time RIC 512, the near-real time RIC 520, and the DU 530 introduced in FIG. 5. The non-real time RIC 512 comprises data collection 513 and policy generation/update 514, as introduced in FIG. 5. The near-real time RIC 520 comprises performance monitoring 521 and policy execution 522. The DU comprises scheduler 531.

FIG. 6 illustrates interactions of the illustrated components over time, and a timeline is included at the left side of FIG. 6. Furthermore, there are two different repeating cycles illustrated in FIG. 6: the repeating policy update cycle 600, and the repeating bit rate update cycle 610. One iteration of the illustrated repeating cycles is illustrated, and subsequent iterations of each cycle can be performed subsequently. Also, multiple iterations of the repeating bit rate update cycle 610 can optionally be performed during a single corresponding iteration of the repeating policy update cycle 600.

FIG. 6 illustrates data collection 601, whereby the data collection component 513 can collect performance data 533 from the DU 530. The data collection component 513 can provide some or all of the collected performance data 533 to policy generation/update 514, as data 602. Policy generation/update 514 can generate a new policy or modify a previously existing policy, resulting in minimum bit rate policy 515. Policy generation/update 514 can provide the minimum bit rate policy 515 to the near-real time RIC 520 for further action by policy execution 522.

Once in possession of the minimum bit rate policy 515, the near-real time RIC 520 can apply the minimum bit rate policy 515 as often as desired, pursuant to the repeating bit rate update cycle 610, until the minimum bit rate policy 515 is replaced by a next minimum bit rate policy 515, at which point the near-real time RIC 520 can apply the next minimum bit rate policy 515. The near-real time RIC 510 can operate using a control loop which can operate, e.g., in repeating cycles which can be repeated every 10 milliseconds (ms) up to 1 second.

In an example bit rate update cycle according to repeating bit rate update cycle 610, performance monitoring 521 can be configured to receive performance data 532 from the DU 530. Performance monitoring 521 can filter the performance data 532 and optionally use aspects of performance data 532 to look up action(s) in the minimum bit rate policy 515. Performance monitoring 521 can provide resulting filtered data and action requests 611 to policy execution 522. Policy execution 522 can be configured to apply the minimum bit rate policy 515 by generating and sending, based on filtered data and action requests 611, minimum bit rate and other adjustments 523 to the DU scheduler 531.

In embodiments according to FIG. 6, a controller implemented via the non-real time RIC 512 and the near-real time RIC 520 learns improved minimum bit rate configurations for each network condition such as channel (e.g. RSRP) and load (e.g. PRB utilization). Improved configurations can be stored in a knowledge base which is iteratively improved based on new collected performance data 533. Such a knowledge base can be used to make future minimum bit rate decisions with a higher probability of recommending optimal, or at least improved minimum bit rate configurations, in comparison to reactive configuration approaches.

In some embodiments, an open RAN (ORAN) type architecture can be adopted to host controller logic. The ORAN architecture can comprise the non-real time RIC 512 and the near-real time RIC 520, along with other ORAN components.

The non-real time RIC 512 can be configured to maintain a knowledge base of policy applicable to different network conditions. The policy can contain network conditions, thresholds, and actions. The network conditions can be collected via performance data 533 over an O1 interface. The network conditions can include, inter alia, PRB utilization information and RSRP information. The PRB utilization information can comprise, e.g., a total number of PRBs used to carry user equipment traffic, divided by a total number of available PRBs available to the scheduler 531. The RSRP information can comprise, e.g., RSRP data reported by UEs as part of cell selection and/or measurement reporting for mobility management.

The thresholds included in a minimum bit rate policy 515 can include, e.g., x1, x2 and U data for each network condition. Thresholds can be initialized by a network operator based on domain knowledge and can be continuously improved based on future performance data 533 measurements.

The actions included in a minimum bit rate policy 515 can include, e.g., improved or optimal values for the minimum bit rates stored in the knowledge base for each network condition (e.g. b1, b2, . . . , etc.). For example, an action can select a low minimum bit rate for user equipment with low RSRP, and vice versa. In addition, an action can select a lower min bitrate when a user equipment's PRB utilization is high, to avoid negative impacts on cell throughput.

The non-real time RIC 512 can be configured to evaluate the knowledge base and adapt the actions corresponding to different network conditions when network KPIs are not met. FIG. 8 illustrates example adaptation of actions under such circumstances. For example, if a minimum bit rate in an action was not achieved for a configured user equipment, then a lower minimum bit rate value can be stored in an action. That is, a lower minimum bit rate $b_x$ can replace a minimum bit rate $b_3$ stored in the knowledge base, where a user-achieved bit rate $R_n$ can be defined as:

$$R_n = \frac{L_n}{t_2 - t_1}$$

Where $L_n$ is the total number of transmitted bits to user n in duration from $t_1$ to $t_2$.

Similarly, if a minimum bit rate in an action was only achieved for a subset of the network conditions (e.g. achieved for a recorded RSRP, but only under lower PRB utilization), then the corresponding network condition can be updated, and a modified minimum bit rate policy 515 may be created.

The non-real time RIC 512 can be configured to send the minimum bit rate policy 515 to the near-real time RIC 520 over an A1 interface. The above procedure for the non-real time RIC 512 can be repeated in one or more repetition cycles, which can optionally occur at a slower pace compared to the cycles performed by the near-real time RIC 520. In an example, repetition cycles for the non-real time RIC 512 can occur each 0.1-10 seconds.

The near-real time RIC 520 can be configured to store the minimum bit rate policy 515 knowledge base received from non-real time RIC 512 over the A1 interface. Additionally, the near-real time RIC 520 can receive performance data 532 from the DU 530 via the E2 interface. The performance data 532 can include, e.g., network KPIs such as PRB utilization, RSRP and user achieved throughput. The near-real time RIC 520 can use the network KPIs to retrieve corresponding actions from the minimum bit rate policy 515 knowledge base, and the near-real time RIC 520 can send retrieved actions (i.e. minimum bit rate and other adjustments 523) to the scheduler 531.

The scheduler 531 can be configured to send performance data 533, e.g., network KPIs and network conditions, to the non-real time RIC 512 over the O1 interface. The scheduler 531 can furthermore be configured to send performance data 531, e.g., network KPIs and network conditions, to the near-real time RIC 520 over the E2 interface. The scheduler 531 can send performance data 532 and/or 533 periodically, at certain events (e.g. in response to a user equipment attaching to the cell), or based on requests from the RICs 512 and 520. In some embodiments, the scheduler 531 can report performance data 532 and/or 533 separately for each user equipment.

The scheduler 531 can furthermore be configured to receive the minimum bit rate and other adjustments 523 from the near-real time RIC 520, and the scheduler 531 can be configured to apply the minimum bit rate and other adjustments 523 to each user equipment during resource allocation procedures.

FIG. 7 is a table representing a portion of an example minimum bit rate policy, in accordance with various aspects and embodiments of the subject disclosure. FIG. 7 includes a policy index column, a conditions column including network conditions, and an actions column including minimum bit rate actions to apply under the different network conditions. The network conditions can be associated with thresholds, as shown. Thus, when RSRP<$x_1$ (where $x_1$ represents a threshold value), the action can comprise "min bitrate=$b_1$", i.e., set a UE minimum bit rate at the value $b_1$. FIG. 7 includes various other example network conditions, thresholds, and actions. The listed examples are not intended to be exhaustive and any network conditions, thresholds, and actions can be included.

FIG. 8 is a table representing example evaluation and update of a minimum bit rate policy, in accordance with various aspects and embodiments of the subject disclosure. FIG. 8 includes a used policy column, a monitored network KPI column, an evaluation column, and an actions column. In the first example row, performance data 533 indicated that a minimum bit rate $b_x$ was achieved by a UE, and $b_x$ is greater than $b_1$, where $b_1$ is the example target minimum bit rate for the UE. Therefore, the evaluation reports a valid policy and actions include keep current setting. In the example second row, performance data 533 indicated that a minimum bit rate $b_x$ was achieved by a UE, and $b_x$ is less than $b_2$, where $b_2$ is the example target minimum bit rate for the UE. Therefore, the evaluation reports a suboptimal policy and actions include updating the policy 515 to set $b_2=b_x$. Various other example rows provide other examples, and the listed examples are not intended to be exhaustive and any monitored KPIs, evaluations, and actions can be included.

Figure 9:
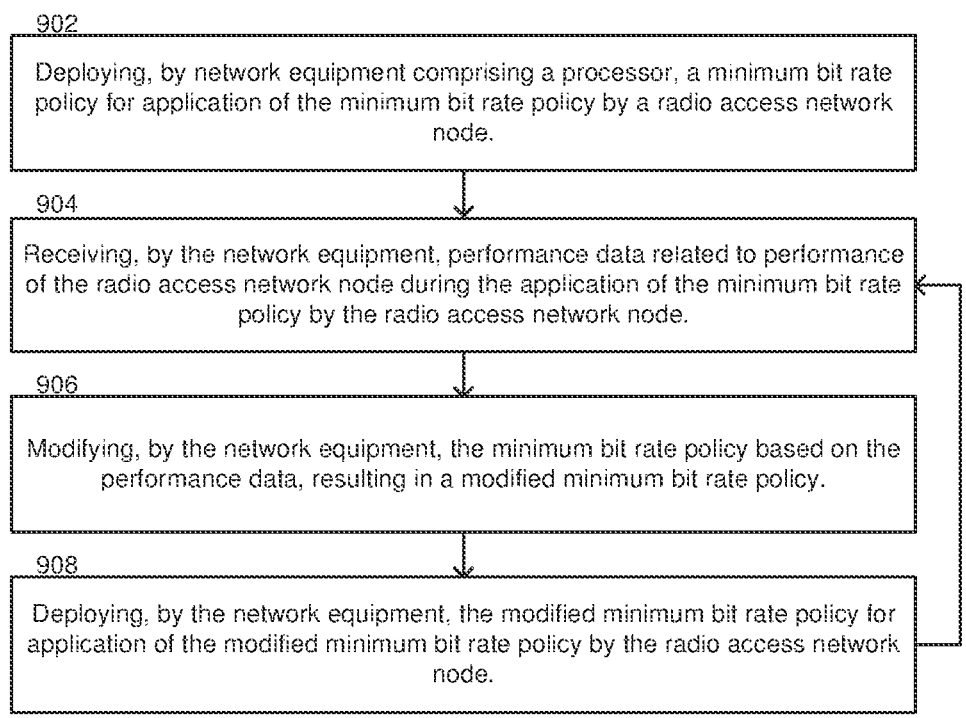
FIG. 9 is a flow diagram representing a set of example operations of first network equipment in connection with adjusting minimum bit rates based on a minimum bit rate policy, in accordance with various aspects and embodiments of the subject disclosure.

FIG. 9 is a flow diagram representing a set of example operations of first network equipment, such as the non-real time RIC 512 illustrated in FIG. 5, in connection with adjusting minimum bit rates based on a minimum bit rate policy, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment such as the non-real time RIC 512 illustrated in FIG. 5. The non-real time RIC 512 can generate and deploy a minimum bit rate policy 515 by sending the minimum bit rate policy 515 to other network equipment, such as a near-real time RIC 520. Example operation 902 comprises deploying, by network equipment 512 comprising a processor, a minimum bit rate policy 515 for application of the minimum bit rate policy 515 by a radio access network node such as DU 530.

The minimum bit rate policy 515 deployed at operation 902 can comprise network conditions, e.g., a group of network conditions, and corresponding minimum bit rates. Network conditions in the group of network conditions can comprise channel conditions and load conditions. The channel conditions can comprise reference signal received power conditions. The load conditions comprise physical resource block utilization conditions. Furthermore, network conditions in the group of network conditions can comprise threshold information associated with the network conditions.

With regard to the minimum bit rates in the minimum bit rate policy 515, at least one first respective minimum bit rate can be correlated with a respective network condition of the group of network conditions. The at least one first respective minimum bit rate can be for application to user equipment served by the radio access network node 530, in response to observation of the respective network condition. For example, the observation of the network condition can be reported via performance data 532, and the at least one first respective minimum bit rate can be sent to the radio access network node 530 in response to performance data 532.

Operation 904 comprises receiving, by the network equipment 512, performance data 533 related to performance of the radio access network node 530 during the application of the minimum bit rate policy 515 by the radio access network node 530. Operation 906 comprises modifying, by the network equipment 512, the minimum bit rate policy 515 based on the performance data 533, resulting in a modified minimum bit rate policy 515. The initial minimum bit rate policy 515 and the modified minimum bit rate policy 515 are both instances of a minimum bit rate policy 515 and so are both referred to by identifier 515 in FIG. 5.

The modified minimum bit rate policy 515 can comprise modified network conditions and/or modified minimum bit rates. For example, the modified minimum bit rate policy 515 can comprise at least one second respective minimum bit rate correlated with the previously described respective network condition of the group of network conditions. Like the first respective minimum bit rate, the at least one second respective minimum bit rate can be for application to the user equipment served by the radio access network node 530 in response to the observation of the respective network condition.

In some cases, modifying the minimum bit rate policy 515 at operation 906 can be based on performance data 533 that indicates that a minimum bit rate, e.g., the at least one first respective minimum bit rate, was not achieved by the radio access network node 530. Modifying the minimum bit rate policy 515 based on the performance data 533 can comprise lowering such a bit rate, e.g., the at least one first respective minimum bit rate, resulting in, e.g., the at least one second respective minimum bit rate.

In some cases, modifying the minimum bit rate policy 515 at operation 906 can comprise modifying network conditions in which a minimum bit rate is applied, resulting in a modified minimum bit rate policy 515 that comprises a modified network condition in the group of network conditions. Another minimum bit rate, e.g., at least one third respective minimum bit rate, can be correlated with the modified network condition. Like the first and second respective minimum bit rates, the at least one third respective minimum bit rate can be for application to the user equipment served by the radio access network node 530 in response to an observation of, in this case, the modified network condition.

Operation 908 comprises deploying, by the network equipment 512, the modified minimum bit rate policy 515 for application of the modified minimum bit rate policy 515 by the radio access network node 530. For example, the non-real time RIC 512 can deploy the modified minimum bit rate policy 515 to the real-time RIC 520, for application of the modified minimum bit rate policy 515 by the radio access network node 530 under the direction of the real-time RIC 520.

Figure 10:
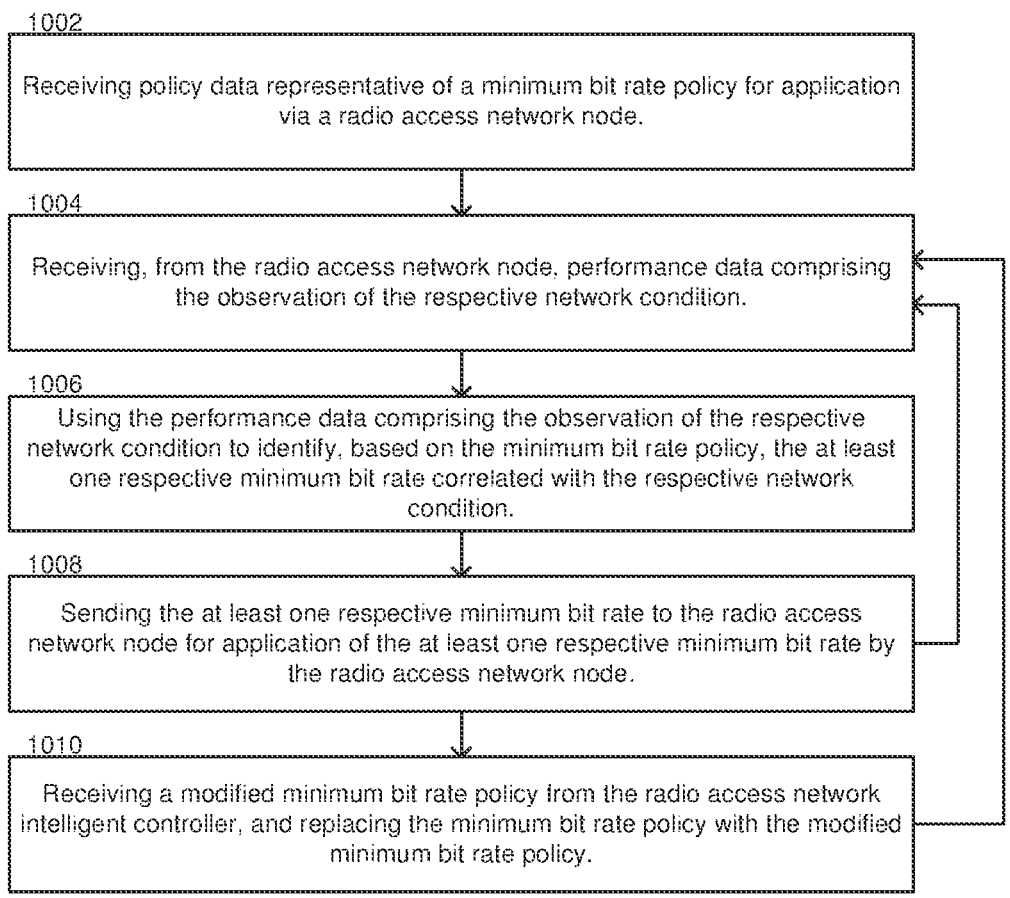
FIG. 10 is a flow diagram representing a set of example operations of second network equipment in connection with adjusting minimum bit rates based on a minimum bit rate policy, in accordance with various aspects and embodiments of the subject disclosure.

FIG. 10 is a flow diagram representing a set of example operations of second network equipment, such as the near-real time RIC 520 illustrated in FIG. 5, in connection with adjusting minimum bit rates based on a minimum bit rate policy, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by network equipment such as the near-real time RIC 520 illustrated in FIG. 5. In general, FIG. 10 illustrates example operations to receive a minimum bit rate policy 515 from by the non-real time RIC 512, and apply the minimum bit rate policy 515 via the DU 530.

Example operation 1002 comprises receiving policy data representative of a minimum bit rate policy 515 for application via a radio access network node such as DU 530. The minimum bit rate policy 515 can comprise network conditions, e.g., a group of network conditions, and minimum bit rates correlated with the network conditions. The network conditions in the group of network conditions can comprise channel conditions and load conditions. The channel conditions can comprise, inter alia, reference signal received power conditions. The load conditions comprise, inter alia, physical resource block utilization conditions. The network conditions in the group of network conditions can also comprise threshold information associated with the network conditions.

The minimum bit rates included in the minimum bit rate policy 515 can comprise, e.g., at least one respective minimum bit rate correlated with a respective network condition of the group of network conditions. The at least one respective minimum bit rate can be for application to user equipment served by the radio access network node 530 in response to observation of the respective network condition.

Example operation 1004 comprises receiving, from the radio access network node 530, performance data 532 comprising, e.g., the observation of the respective network condition. Example operation 1006 comprises using the performance data 532 comprising the observation of the respective network condition to identify, based on the minimum bit rate policy 515, the at least one respective minimum bit rate correlated with the respective network condition. Example operation 1008 comprises sending the at least one respective minimum bit rate to the radio access network node 530 for application of the at least one respective minimum bit rate by the radio access network node 530.

The operations 1004, 1006, and 1008 can be repeated in a repeating bit rate update cycle 610, at any desired frequency and for any desired duration. At a future time, optionally after multiple repetitions of operations 1004, 1006, and 1008, operation 1010 can occur, e.g., pursuant to the repeating policy update cycle 600. Operation 1010 can comprise receiving a modified minimum bit rate policy 515, e.g., from the non-real time RIC 512, and replacing the minimum bit rate policy (the initially received minimum bit rate policy 515) with the modified minimum bit rate policy 515. Operation 1010 can be followed by returning to the operation 1004 and the repeating bit rate update cycle 610 comprising operations 1004, 1006, and 1008.

Figure 11:
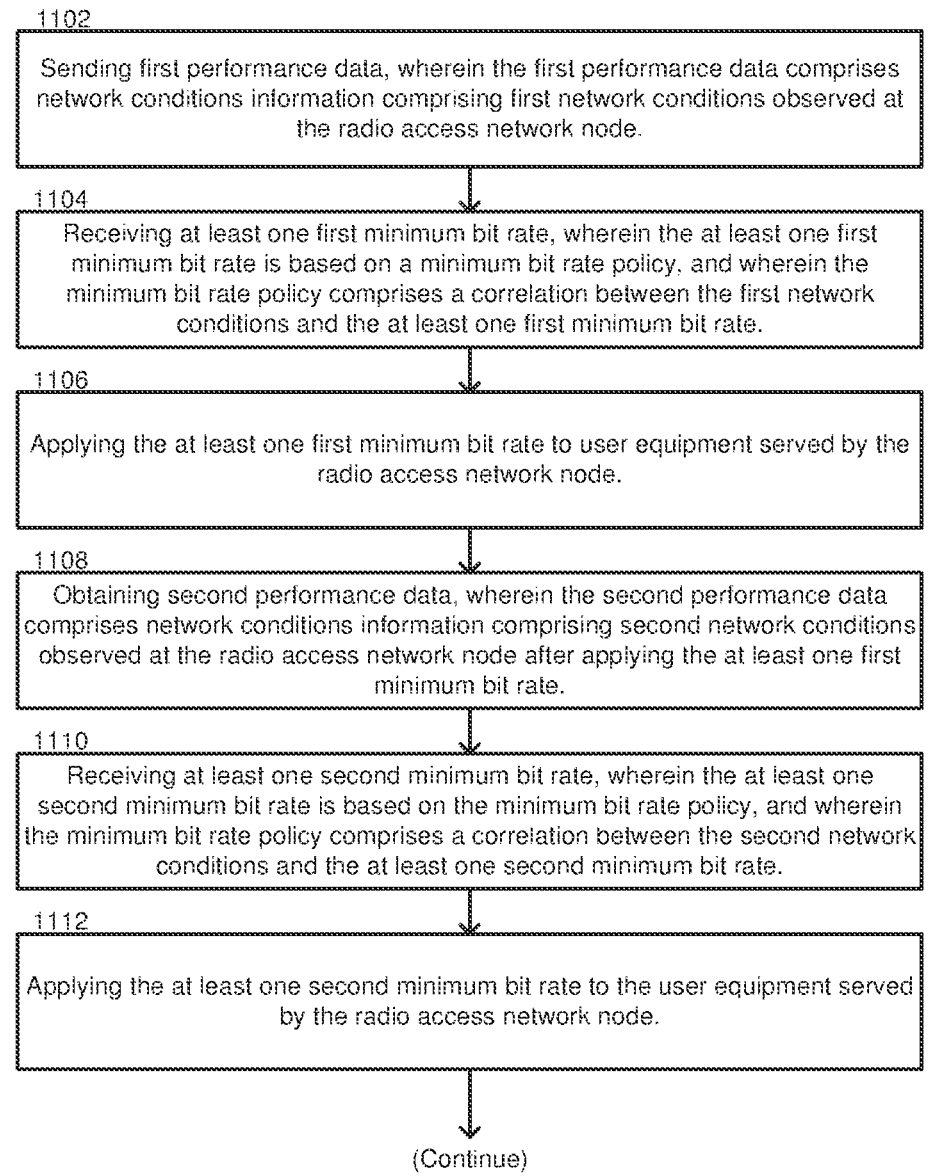
FIG. 11 is a flow diagram representing a set of example operations of third network equipment in connection with adjusting minimum bit rates based on a minimum bit rate policy, in accordance with various aspects and embodiments of the subject disclosure.

FIG. 11 is a flow diagram representing a set of example operations of third network equipment, such as the radio access network node represented by DU 530 in FIG. 5, in connection with adjusting minimum bit rates based on a minimum bit rate policy, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 11 can be performed, for example, by network equipment such as the DU 530 illustrated in FIG. 5. Example operation 1102 comprises sending first performance data, e.g., performance data 532, wherein the first performance data 532 comprises network conditions information comprising first network conditions observed at the radio access network node 530. Example operation 1104 comprises receiving at least one first minimum bit rate, e.g., among minimum bit rate & other adjustments 523, wherein the at least one first minimum bit rate (from 523) is based on a minimum bit rate policy 515, and wherein the minimum bit rate policy 515 comprises a correlation between the first network conditions and the at least one first minimum bit rate (from 523). Example operation 1106 comprises applying the at least one first minimum bit rate (from 523) to user equipment served by the radio access network node 530. Applying the at least one first minimum bit rate (from 523) to the user equipment can comprise adjusting a minimum bit rate associated with the user equipment according to the at least one first minimum bit rate (from 523).

The operations 1102, 1104, and 1106 can be repeated via operations 1108, 1110, and 1112, albeit with different performance data 532 and different minimum bit rate & other adjustments 523. Furthermore, the repetition can continue, as noted in FIG. 11. Example operation 1108 comprises obtaining second performance data 532, wherein the second performance data 532 comprises network conditions information comprising second network conditions observed at the radio access network node 530 after applying the at least one first minimum bit rate (from 523). The second performance data 532 can be sent to the near-real time RIC 520. Example operation 1110 comprises receiving at least one second minimum bit rate (e.g., a second transmission of minimum bit rate & other adjustments 523), wherein the at least one second minimum bit rate (from a second instance of 523) is based on the minimum bit rate policy 515, and wherein the minimum bit rate policy 515 comprises a correlation between the second network conditions 532 and the at least one second minimum bit rate (from a second instance of 523). Example operation 1112 comprises applying the at least one second minimum bit rate (from a second instance of 523) to the user equipment served by the radio access network node 530. Applying the at least one second minimum bit rate (from a second instance of 523) to the user equipment can comprise adjusting the minimum bit rate associated with the user equipment according to the at least one second minimum bit rate (from a second instance of 523).

The repetition of operations 1102, 1104, and 1106 can continue after operation 1112, by sending updated performance data 532 and receiving and applying updated minimum bit rate & other adjustments 523. Furthermore, in FIG. 11, the sending of performance data 532 at operations 1102 and 1108, and subsequent repetitions thereof, can optionally be accompanied by sending performance data 533 to the non-real time RIC 512, so that the non-real time RIC 512 can calculate and provide the modified minimum bit rate policy 515 to the near-real time RIC 520.

Figure 12:
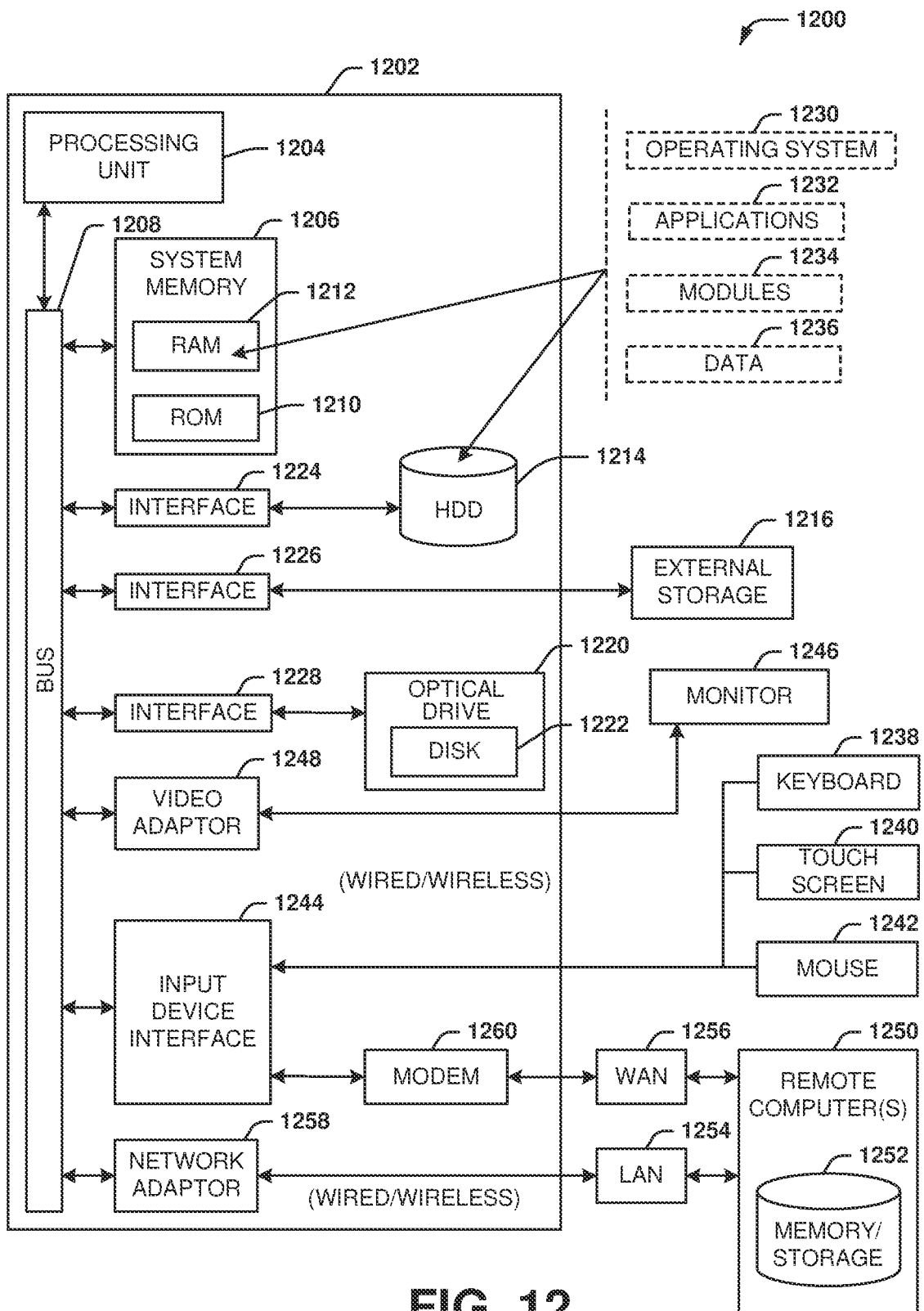
FIG. 12 is a block diagram of an example computer that can be operable to execute processes and methods in accordance with various aspects and embodiments of the subject disclosure.

FIG. 12 is a block diagram of an example computer that can be operable to execute processes and methods in accordance with various aspects and embodiments of the subject disclosure. The example computer can be adapted to implement, for example, any of the various network equipment described herein.

FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    deploying, by network equipment comprising a processor, a minimum bit rate policy for application of the minimum bit rate policy by a radio access network node, wherein the minimum bit rate policy comprises:
        a group of network conditions; and
        minimum bit rates respectively assigned to network conditions of the group of network conditions, wherein the respective minimum bit rates are applied to user equipment served by the radio access network node in response to occurrences of the respective network conditions, wherein the applying the respective minimum bit rates to the user equipment in response to the occurrences of the network conditions comprises assigning respective radio network resources to the user equipment based on the respective minimum bit rates applied to the user equipment;
    receiving, by the network equipment, performance data related to performance of the radio access network node during the application of the minimum bit rate policy by the radio access network node to the user equipment served by the radio access network node; and
    modifying, by the network equipment, the minimum bit rate policy based on the performance data, resulting in a modified minimum bit rate policy, wherein the modified minimum bit rate policy comprises at least one modified respective minimum bit rate assigned to at least one of the network conditions of the group of network conditions, and wherein the at least one modified respective minimum bit rate is applied to the user equipment served by the radio access network node in response to the occurrences of the at the least one of the network conditions.

2. The method of claim 1, further comprising deploying, by the network equipment, the modified minimum bit rate policy for application of the modified minimum bit rate policy by the radio access network node.

3. The method of claim 1, wherein the network conditions in the group of network conditions comprise channel conditions and load conditions.

4. The method of claim 3, wherein the channel conditions comprise reference signal received power conditions.

5. The method of claim 3, wherein the load conditions comprise physical resource block utilization conditions.

6. The method of claim 1, wherein the network conditions in the group of network conditions comprise threshold information associated with the network conditions.

7. The method of claim 1, wherein the performance data indicates that a minimum bit rate of the minimum bit rates was not achieved by the radio access network node in response to an occurrence of the respective assigned network condition, and wherein modifying the minimum bit rate policy based on the performance data comprises lowering the minimum bit rate assigned to the network condition, resulting in the modified respective minimum bit rate assigned to the network condition.

8. The method of claim 1, wherein the modified minimum bit rate policy further comprises a modified network condition in the group of network conditions, and a modified respective minimum bit rate assigned to the modified network condition, and wherein the modified respective minimum bit rate is applied to the user equipment served by the radio access network node in response to an occurrence of the modified network condition.

9. The method of claim 1, wherein the network equipment comprises a non-real time radio access network intelligent controller, and wherein the network equipment deploys the minimum bit rate policy by sending the minimum bit rate policy to a radio access network intelligent controller.

10. Network equipment, comprising:
    a processor; and
    a memory that stores executable instructions that, when executed by the processor, facilitate performance of operations, comprising:
        receiving policy data representative of a minimum bit rate policy for application via a radio access network node, wherein the minimum bit rate policy comprises:
            a group of network conditions; and
            minimum bit rates respectively assigned to network conditions of the group of network conditions, wherein the respective minimum bit rates are applied to user equipment served by the radio access network node in response to occurrences of the respective network conditions, wherein the applying the respective minimum bit rates to the user equipment in response to the occurrences of the network conditions comprises assigning respective radio network resources to the user equipment based on the respective minimum bit rates applied to the user equipment;
        receiving, from the radio access network node, performance data comprising an indication of an occurrence of a network condition of the group of network conditions;

identify, based on the minimum bit rate policy and the performance data, a minimum bit rate assigned to the network condition; and sending the minimum bit rate to the radio access network node for application of the minimum bit rate by the radio access network node to the user equipment.

11. The network equipment of claim 10, wherein the network conditions in the group of network conditions comprise channel conditions and load conditions.

12. The network equipment of claim 11, wherein the channel conditions comprise reference signal received power conditions.

13. The network equipment of claim 11, wherein the load conditions comprise physical resource block utilization conditions.

14. The network equipment of claim 10, wherein the network conditions in the group of network conditions comprise threshold information associated with the network conditions.

15. The network equipment of claim 10, wherein the network equipment comprises a near-real time radio access network intelligent controller, and wherein the network equipment receives the minimum bit rate policy from a radio access network intelligent controller.

16. The network equipment of claim 10, wherein the operations further comprise receiving a modified minimum bit rate policy and replacing the minimum bit rate policy with the modified minimum bit rate policy.

17. A non-transitory machine-readable medium, comprising executable instructions that, when executed by a processor of network equipment, facilitate performance of operations, comprising:

deploying a minimum bit rate policy for application of the minimum bit rate policy by a radio access network node, wherein the minimum bit rate policy comprises:
  a group of network conditions; and
  minimum bit rates respectively assigned to network conditions of the group of network conditions, wherein the respective minimum bit rates are applied to user equipment served by the radio access network node in response to occurrences of the respective network conditions, wherein the applying the respective minimum bit rates to the user equipment in response to the occurrences of the network conditions comprises assigning respective radio network resources to the user equipment based on the respective minimum bit rates applied to the user equipment;

receiving performance data related to performance of the radio access network node during the application of the minimum bit rate policy by the radio access network node to the user equipment served by the radio access network node; and modifying the minimum bit rate policy based on the performance data, resulting in a modified minimum bit rate policy, wherein the modified minimum bit rate policy comprises at least one modified respective minimum bit rate assigned to at least one of the network conditions of the group of network conditions, and wherein the at least one modified respective minimum bit rate is applied to the user equipment served by the radio access network node in response to the occurrences of the at the least one of the network conditions.

18. The non-transitory machine-readable medium of claim 17, wherein the operations further comprise deploying the modified minimum bit rate policy for application of the modified minimum bit rate policy by the radio access network node.

19. The non-transitory machine-readable medium of claim 17, wherein the network conditions in the group of network conditions comprise channel conditions and load conditions.

20. The non-transitory machine-readable medium of claim 19, wherein the channel conditions comprise reference signal received power conditions.

* * * * *